March 12, 1929.  A. L. KNAPP  1,704,798
MOTOR VEHICLE
Filed Feb. 16, 1925
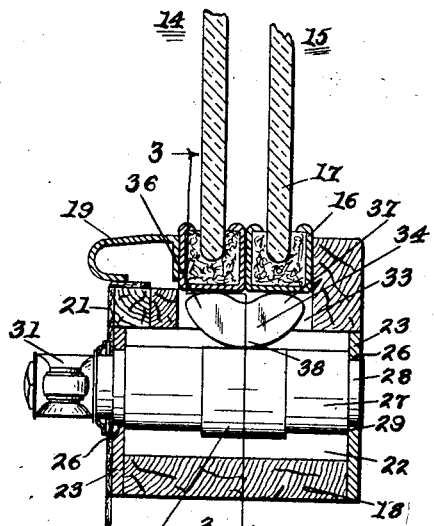
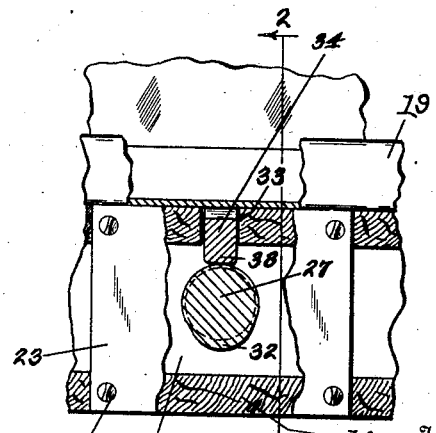
Inventor:
Archer L. Knapp,
By
Attorney.

Patented Mar. 12, 1929.

1,704,798

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed February 16, 1925. Serial No. 9,424.

This invention relates to motor vehicles, and particularly to the slidably mounted windows frequently used in closed bodies of such vehicles. An object of the invention is to provide means whereby a pair of cooperating sashes, which form the closure of a window opening in a vehicle body, may be rigidly clamped in adjusted position.

Another object of the invention is to provide clamping means for the sliding sashes of vehicle bodies in which the clamping pressure is equalized, whereby each of the cooperating sashes is rigidly secured regardless of manufacturing irregularities and variations in size.

Other objects of the invention will appear from the following description taken in connection with the drawing, which forms a part of this specification, and in which:

Fig. 1 is a perspective view of a portion of the body of a motor vehicle showing the application of the invention thereto;

Fig. 2 is a detail view showing the construction of the clamping means, partially in elevation and partially in section on the line 2—2 of Fig. 3, and Fig. 3 is a detail view, broken away and partially in section on the line 3—3 of Fig. 2.

In closed motor vehicle bodies of the limousine type, it is frequently desired to form the window or glass partition between the driver's compartment and the rear compartment or tonneau, of a pair of horizontal slidable sashes arranged side by side, either or both of which may be adjustably positioned to regulate the amount of opening between the compartments. It is very desirable that such sashes be so secured as not to rattle or to change their position when the vehicle is in motion, and to this end they are frequently mounted in slides having a rather tight fit. This arrangement however, prevents the free adjustment of the sashes by reason of the resistance to sliding. In the present invention such difficulties are obviated by the provision of a clamping means whereby the sashes may be rigidly retained in their adjusted position, but may be released to slide freely when it is desired to adjust them. At the same time the pressure of the clamping means upon each of the two sashes is equalized, so that should one of the sashes be of slightly different dimensions than the other, within the range of permissible manufacturing variation, the total clamping effort will not be applied exclusively to the larger of such sashes, thus permitting the smaller of the sashes to remain unsecured.

With reference to the accompanying drawing, at 10 is shown a portion of the body of a motor vehicle of the limousine type, having a forward or driver's compartment 11 and a rear or tonneau compartment 12, separated by the usual partition 13. The upper part of the partition 13 is formed of a pair of framed sashes, 14 and 15, each comprising a frame 16, preferably of the familiar pressed metal construction, in which is suitably mounted a glass pane 17. The sashes 14 and 15 are arranged to slide side by side on a frame member 18 of the partition 13 as is clearly shown in Figs. 2 and 3, and the upper edges of the sashes are guided in a suitable groove in the upper frame member of the partition (not shown). The frame member 18 is provided with suitable trim moulding 19, under the lower edge of which the fabric lining 21 of the interior of the vehicle body is secured.

The frame member 18 is formed at a point substantially at its center with a recess or notch 22, the ends of which are closed by metallic plates 23 which may be secured to the frame member in any suitable way as by means of screws 24. Each of the plates 23 is drilled to provide alined holes 26, in which a shaft 27 is journaled on reduced bearing portions 28. These portions provide shoulders 29 by means of which end motion of the shaft 27 is prevented. The shaft 27 projects at one end through the plate 23 and is provided with a suitable handle 31 located within the tonneau portion 12 of the vehicle.

Integral with or suitably secured to the shaft 27 near the central portion thereof is a cam 32 which is adapted to exert a clamping pressure upon the sashes on rotation of the shaft 27. In this way the frames 16 of the sashes 14 and 15 are forced upwardly and tightly clamped. By properly positioning the axis of the shaft 27 with respect to the lower faces of the frames 16, the upward movement of the cam can be utilized to directly engage the frames 16 and exert the clamping effort thereagainst. It has been found, however, that the sizes of the sash frame 16 and the thicknesses of the metal of which such frames are constructed, vary somewhat within commercial limits, so that two frames which are nominally of the same size are not absolutely identical. For this reason it may happen that the upward pressure exerted by the cam on the sash frame 16, when the shaft 27 is rotated, is all exerted against that sash frame which happens to have the thicker metal or to be slightly the larger, leaving the other sash frame totally unsecured.

For this reason the clamping pressure of the cam 32 is equalized between the sashes 14 and 15 so that both of these sashes will be clamped upon rotation of the cam, regardless of commercial variation in their dimensions. To this end a recess 33 is provided in the frame member 18 which communicates with the recess 22, directly above and in the vertical plane of the shaft 27. In the recess 33 is mounted a floating lever or rocker 34, having upwardly disposed ends or lobes 36 and 37, adapted to engage the lower face of the frames of sashes 14 and 15 respectively, and having a downwardly disposed fulcrum portion or lobe 38 adapted to engage the cam 32. All side motion of the lever 34 is prevented by the relatively close fit of the recess 33, and it will be readily seen that any upward pressure exerted by the cam 32 upon rotation of its shaft 27 is communicated to the lever 34 and through it to the bottoms of the sashes 14 and 15. It will also be apparent that any irregularity in the sizes of the sashes is compensated for by a rocking movement of the lever 34 which is free to float in its recess 33 thus equalizing the upwardly directed clamping pressure of the cam 32 between the sashes 14 and 15.

In this way it is insured that ample clamping pressure is exerted against each of the sashes to retain them at all times in adjusted position irrespective of variations in their size and mounting, thus preventing the rattling of the sashes and irregular movements thereof when in adjusted position while the vehicle is in motion.

It will be understood that various forms of the invention other than those described above may be used without departing from the spirit or scope of the invention.

What is claimed is:

1. The combination with a motor vehicle body having a frame member and a pair of framed sashes slidably mounted side by side on said frame member, of a shaft mounted on the frame member and projecting therefrom within the vehicle body, a cam on said shaft, and a floating rocking lever in the frame member adapted to equalize pressure of the cam between the sash frames to clamp said sashes in adjusted position.

2. The combination in a motor vehicle window having a pair of framed sashes adapted to slide adjacent each other, of a floating lever engaging each of said sashes and a cam for actuating said lever to exert and equalize pressure on said sashes, and means for equalizing the pressure of the cam between said sashes.

3. The combination in a motor vehicle body having a recessed frame member and a pair of slidably mounted sashes thereon, of cover plates secured to the frame member to close the recess, a cam in said recess journaled in the cover plates, a locking lever adapted to engage one of the sashes at either end and to engage the cam intermediate said ends, and means for turning the cam.

4. The combination with a motor vehicle body having a pair of sashes slidably mounted therein, of cam means adapted to clamp said sashes in adjusted position, and a floating lever adapted to equalize the clamping pressure of said cam means between the sashes.

5. The combination with a motor vehicle body having a pair of sashes slidably mounted therein, of a floating lever adapted to engage one of the sashes at each of its ends, and means engaging the lever between its ends adapted to urge said lever into clamping engagement with the sashes.

6. A window comprising a frame, a pair of sashes slidable therein, a floating lever in the frame and means for moving the lever to engage the sashes.

7. A window comprising a frame, a pair of sashes slidable therein, a floating, rocking lever in the frame and means for applying the lever to the sashes.

8. A window comprising a frame, a pair of sashes slidably mounted in the frame, a floating, rocking lever in the frame and a cam for moving the lever to engage the sashes.

9. A window comprising a frame, a pair of sashes slidably mounted in the frame, a floating, rocking lever in the frame with each of its ends engaging one of the sashes, a cam engaging the lever and means for actuating the cam to apply the lever.

10. A window comprising a frame, a pair of sashes slidable therein, a lever engaging each of said sashes by line contact and a cam for actuating said lever.

11. A window comprising a frame, a pair of sashes slidable therein, a lever engaging each of said sashes by line contact, a cam engaging the lever by point contact and means for actuating the cam to apply the lever to the sashes.

In testimony whereof I affix my signature.

ARCHER L. KNAPP.